US005593579A

United States Patent [19]

Reynolds

[11] Patent Number: 5,593,579
[45] Date of Patent: Jan. 14, 1997

[54] MECHANICALLY ASSISTED HYDRAULIC FILTER

[76] Inventor: Michael L. Reynolds, P.O. Box 1722, Klamath Falls, Oreg. 97601

[21] Appl. No.: 601,321

[22] Filed: Feb. 16, 1996

[51] Int. Cl.$^6$ .............................. B01D 33/04; E02B 15/04
[52] U.S. Cl. ................................ 210/242.1; 210/242.3; 210/400; 210/923
[58] Field of Search ...................... 210/242.1, 242.3, 210/386, 400, 923, 776, 335

[56] References Cited

U.S. PATENT DOCUMENTS

| | | | |
|---|---|---|---|
| 3,630,376 | 12/1971 | Price | 210/242.3 |
| 3,706,378 | 12/1972 | Markwick | 210/400 |
| 3,951,805 | 4/1976 | Dodd | 210/400 |
| 4,005,018 | 1/1977 | Wyman et al. | 210/400 |
| 4,105,554 | 8/1978 | Janson | 210/242.3 |
| 4,892,652 | 1/1990 | Rudy et al. | 210/400 |
| 4,921,605 | 5/1990 | Chastan-Bagnis et al. | 210/242.3 |
| 5,028,325 | 7/1991 | Hamilton | 210/242.1 |
| 5,043,065 | 8/1991 | Propp | 210/242.3 |
| 5,149,443 | 9/1992 | Varnam | 210/242.3 |
| 5,207,901 | 5/1993 | Ravagnan | 210/242.1 |
| 5,433,229 | 7/1995 | Blair | 210/242.1 |
| 5,457,908 | 10/1995 | Sanders | 210/242.1 |

FOREIGN PATENT DOCUMENTS

| | | |
|---|---|---|
| 2346501 | 10/1977 | France. |
| 1296783 | 11/1972 | United Kingdom. |
| WO80/01293 | 6/1980 | WIPO. |

*Primary Examiner*—Christopher Upton
*Attorney, Agent, or Firm*—Richard C. Litman

[57] ABSTRACT

A filter system for removing a material from a layer of water of selected depth beginning at the surface of a body of water. The system is designed to be mounted to a surface vessel specially adapted to receive the system. The surface vessel has an intake area at its bow. A water intake gate acts as a closure to the intake area. The inlet gate can be lowered to admit water to the intake area as the vessel is propelled through the body of water. An endless conveyer type filter screen is supported by rollers in the intake area. Water passing through the filter screen is discharged through ducts passing through the sides of the vessel. Material separated from the water is conveyed by the filter screen to other equipment for further processing.

20 Claims, 5 Drawing Sheets

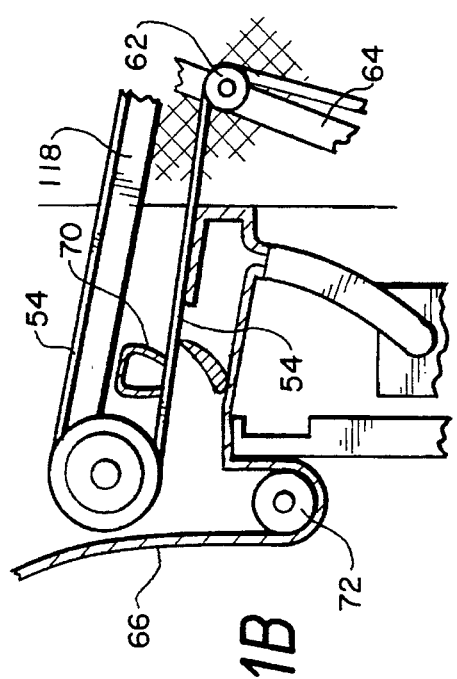
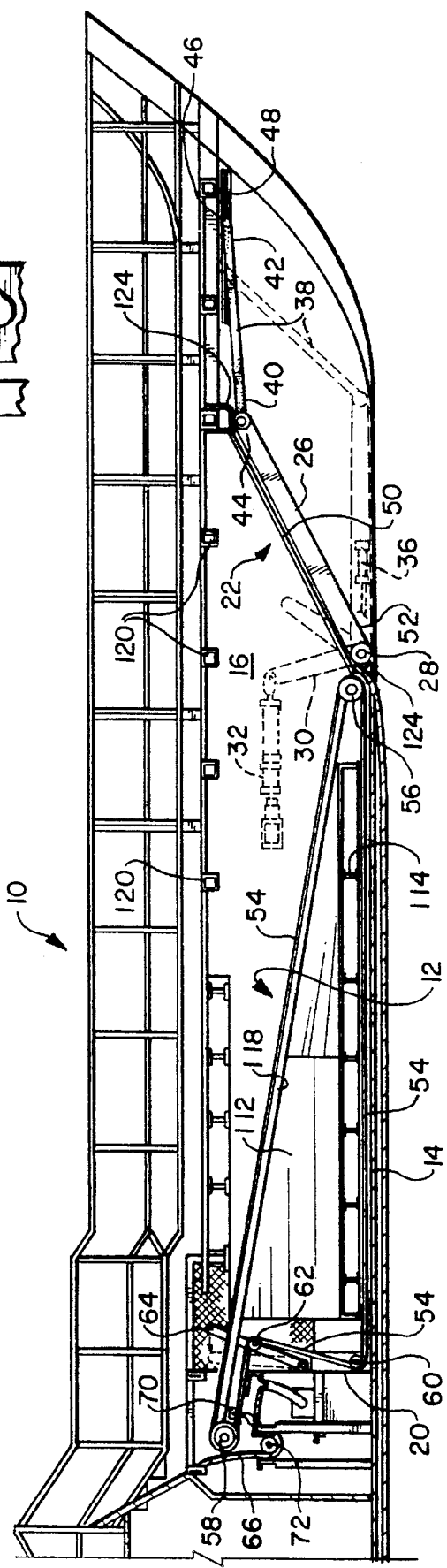
FIG. 1B
FIG. 1A

MECHANICALLY ASSISTED HYDRAULIC FILTER

BACKGROUND OF THE INVENTION

1. Field of the Invention

The present invention relates to a system for separating material from an aqueous medium by filtration.

2. Description of the Prior Art

In many industrially important processes it is necessary to separate material from a body of water, at the site at which the material is found within the body of water. Examples of such processes include skimming oil floating in the water due to oil spills, other types of pollution control, harvesting kelp, and harvesting algae. In these types of processes, a filter system installed in a surface vessel such as a barge or a ship is often used. Examples of such vessels have been proposed in the prior art, however none of the prior art vessels achieve the relatively high rate of filtration made possible by the unique structural design of the present invention.

U.S. Pat. No. 3,630,376, issued on Dec. 28, 1971 to Larry D. Price, shows a skimmer boat for removing oil from the surface of a body of water. The boat of Price does not have the side discharge ducts or the water diverter of the present invention.

U.S. Pat. No. 3,951,805, issued on Apr. 20, 1976 to Joseph C. Dodd, shows an algae harvesting system wherein a rotating drum is used to separate the algae from water flowing through the drum. In the Dodd device water passing through the drum is discharged from a drain pipe communicating with the interior of the drum. The drum is basically in the form of a right circular cylinder of high aspect ratio (i.e. high length to diameter ratio). Therefore, the surface area of the drum exposed to incoming water is far greater than the cross sectional area of even the largest possible drain pipe. Large pressure drops would be required to move water through the drain pipe at the same rate as the water enters the drum, when the drum is moved through the water at high speed. Such pressure drops are generally not achievable even with the aid of a mechanical pump since the pump would cavitate before the desired flow rate can be achieved, and in any event such a pump would consume energy thus increasing the cost of the operation.

The ultimate consequence of the geometric limitations of the Dodd device is that if the drum is moved through the water at high speeds, water would pile up ahead of the drum resulting in a wake which would push the product out of the way of the drum. Thus, instead of increasing product output, moving the drum through the water at higher speeds reduces the efficiency with which the product is separated from the water by the drum system of Dodd. Therefore, systems such as that of Dodd must be operated at low speeds resulting in low production rates. It should also be noted that Dodd does not show the side discharge ducts or the water diverter of the present invention.

U.S. Pat. No. 4,105,554, issued on Aug. 8, 1978 to John J. Janson, shows a split hull boat with a belt conveyor supported in its intake area. The belt conveyor of Janson is not a separator screen but is designed to conduct both water and product to holding tanks for further processing. In addition, Janson does not show the side discharge ducts or the water diverter of the present invention.

U.S. Pat. No. 4,921,605, issued on May 1, 1990 to Lucien Chastan-Bagnis et al., shows a boat for removing pollution from bodies of water. The boat has a central flow channel through which the polluted water flows. A portion of the polluted water is diverted to a decanting chamber where the buoyant pollutant is separated by a floatation type process. The water is then returned to the flow channel and discharged through the rear of the boat. In the Chastan-Bagnis et al. boat, a substantial portion of the water flowing through the boat is not filtered. Further, Chastan-Bagnis et al. do not show the side discharge ducts or the water diverter of the present invention.

U.S. Pat. No. 5,028,325, issued on Jul. 2, 1991 to William R. Hamilton, shows a pontoon boat with a continuous wire conveyer positioned between the pontoons. The conveyer picks up debris floating on the water surface and deposits them in a receptacle. Hamilton does not show the side discharge ducts or the water diverter of the present invention.

U.S. Pat. No. 5,043,065, issued on Aug. 27, 1991 to Carl F. Propp, shows a variable draft skimming vessel. Propp does not show the continuous strip filter screen, the side discharge ducts, or the water diverter of the present invention.

U.S. Pat. No. 5,149,443, issued on Sep. 22, 1992 to O'Neal Varnam, shows an oil skimmer which removes the oil contaminated water layer adjacent to the water surface. The oil contaminated water is conducted to a cascading series of tanks in which the oil is separated from the water by floatation. Varnam does not show the side discharge ducts or the water diverter of the present invention.

United Kingdom Patent Document Number 1,296,783, dated Nov. 15, 1972, by John Vernon Buckland, shows an endless conveyer mounted to a ship and used for removing pollutants from a body of water. Buckland does not show the side discharge ducts or the water diverter of the present invention.

French Patent Document Number 2,346,501, dated Oct. 28, 1977, by Hideo Goto et al., shows a ship for removing floating oil from a body of water. Goto et al. do not show the side discharge ducts or the water diverter of the present invention.

Published International Patent Application Number WO 80/01293, published Jun. 26, 1980, by Peter Brian Smith, shows a ship mounted conveyer for removing floating oil from a body of water. Smith does not show the side discharge ducts or the water diverter of the present invention.

None of the above inventions and patents, taken either singly or in combination, is seen to describe the instant invention as claimed.

SUMMARY OF THE INVENTION

The present invention relates to a filter system for removing a material from a layer of water of selected depth beginning at the surface of a body of water. The system is designed to be mounted to a surface vessel specially adapted to receive the system. The surface vessel has an intake area at its bow. A water intake gate acts as a closure to the intake area. The inlet gate can be lowered to admit water to the intake area as the vessel is propelled through the body of water. An endless conveyer type filter screen is supported by rollers in the intake area. Water passing through the filter screen is discharged through ducts passing through the sides of the vessel. Material separated from the water is conveyed by the filter screen to other equipment for further processing.

Accordingly, it is a principal object of the invention to provide a filter system that can be propelled through the water at relatively high speed without losing filtration efficiency.

It is another object of the invention to provide a filter system that reduces the effects of the formation of a wake ahead of the filter system, as the filter system is propelled through a body of water.

It is a further object of the invention to provide a filter system having an endless conveyer type filter and side discharge ducts having substantially the same flow area as the intake flow area.

Still another object of the invention is to provide a filter system which can filter the water to any selected depth within a predetermined range of depths.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is a side elevational view in cross section of the filter system of the present invention.

FIG. 1B is a fragmentary detail view of the area around the topmost return roller of the endless conveyer type filter screen used in the present invention.

Similar reference characters denote corresponding features consistently throughout the attached drawings.

DETAILED DESCRIPTION OF THE PREFERRED EMBODIMENTS

Figure 2:
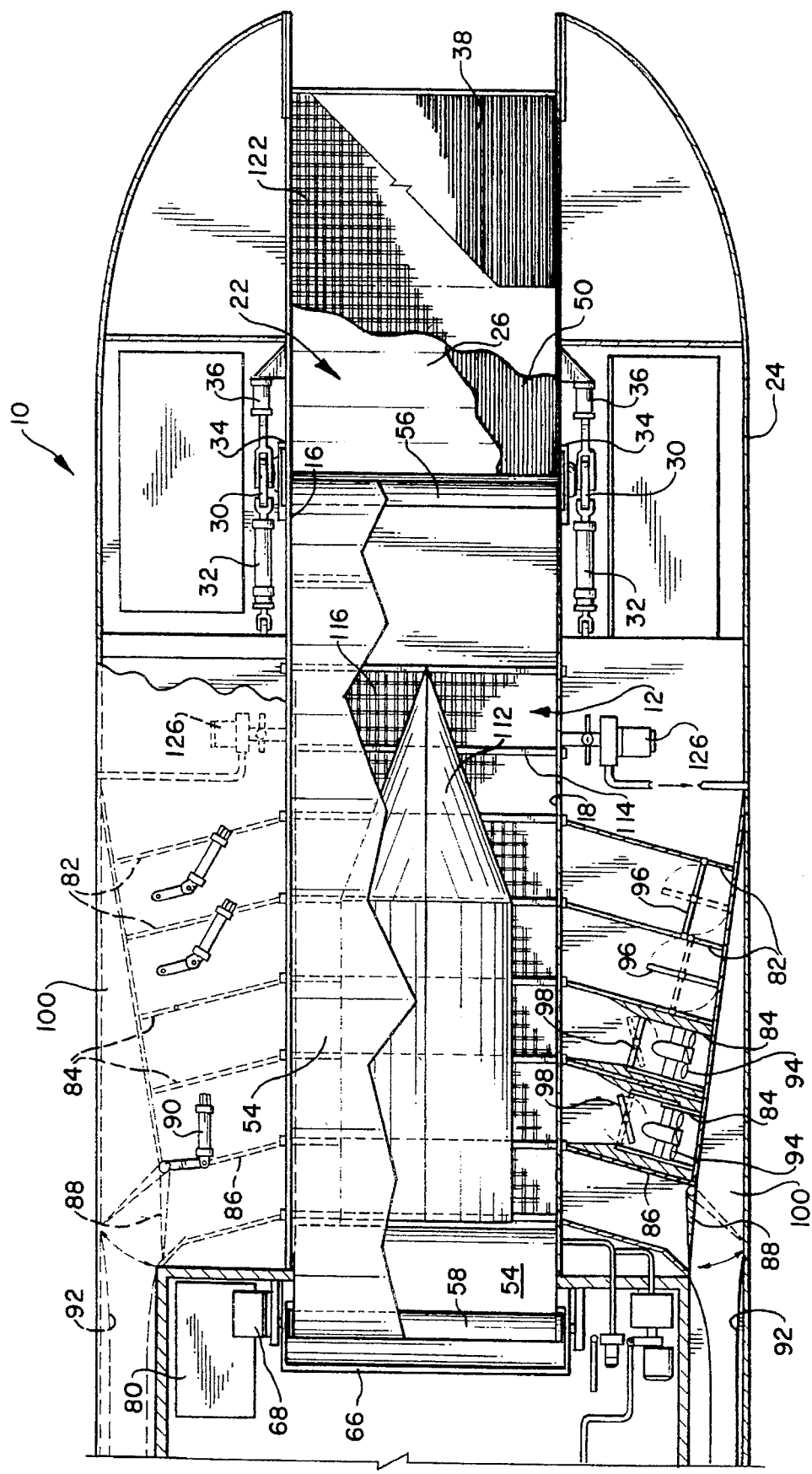
FIG. 2 is a top plan view of the bow portion of the filter system of the present invention partially broken away to reveal internal detail.
Figure 3:
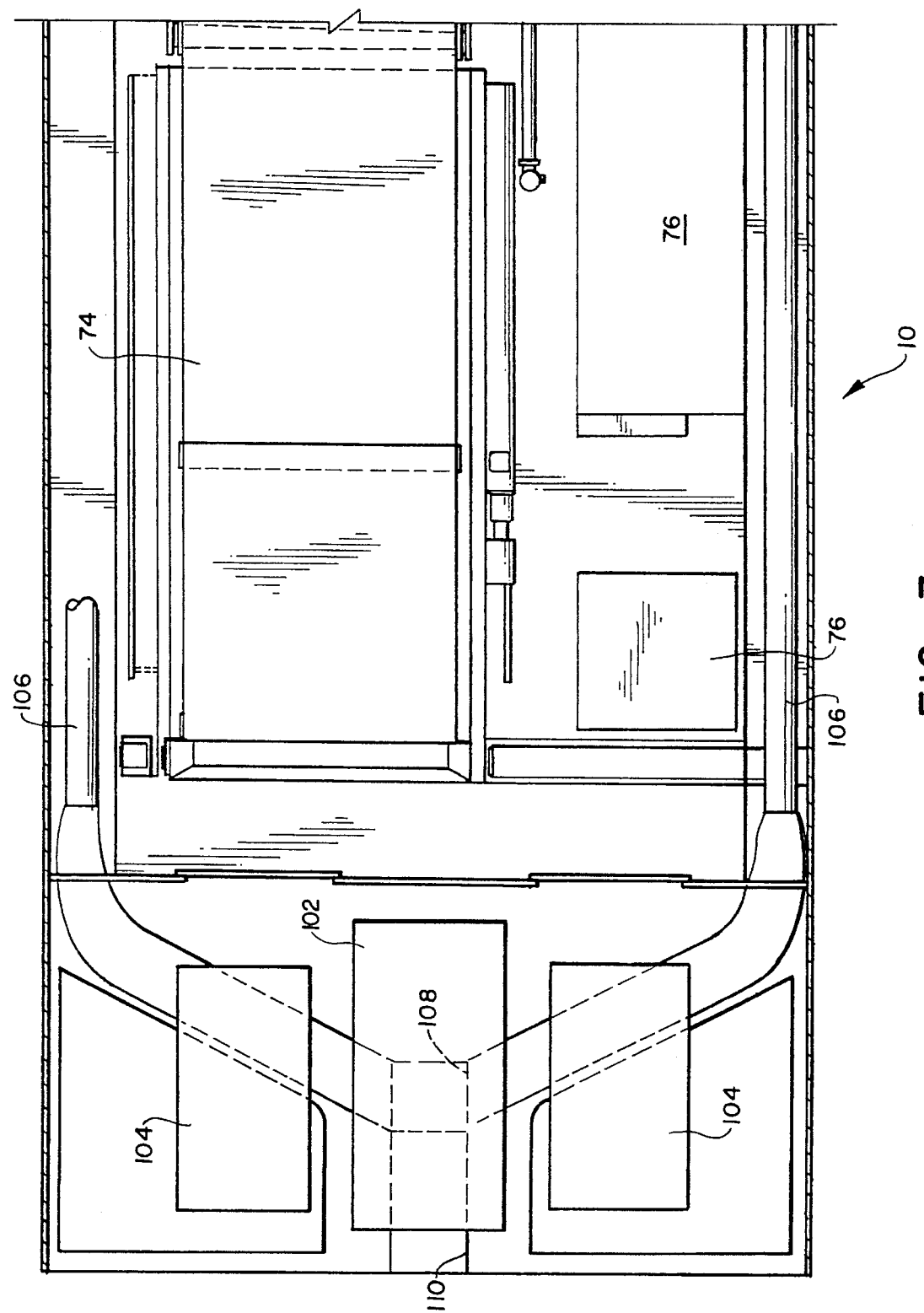
FIG. 3 is a top plan view of the stern portion of the filter system of the present invention partially broken away to reveal internal detail.
Figure 4:
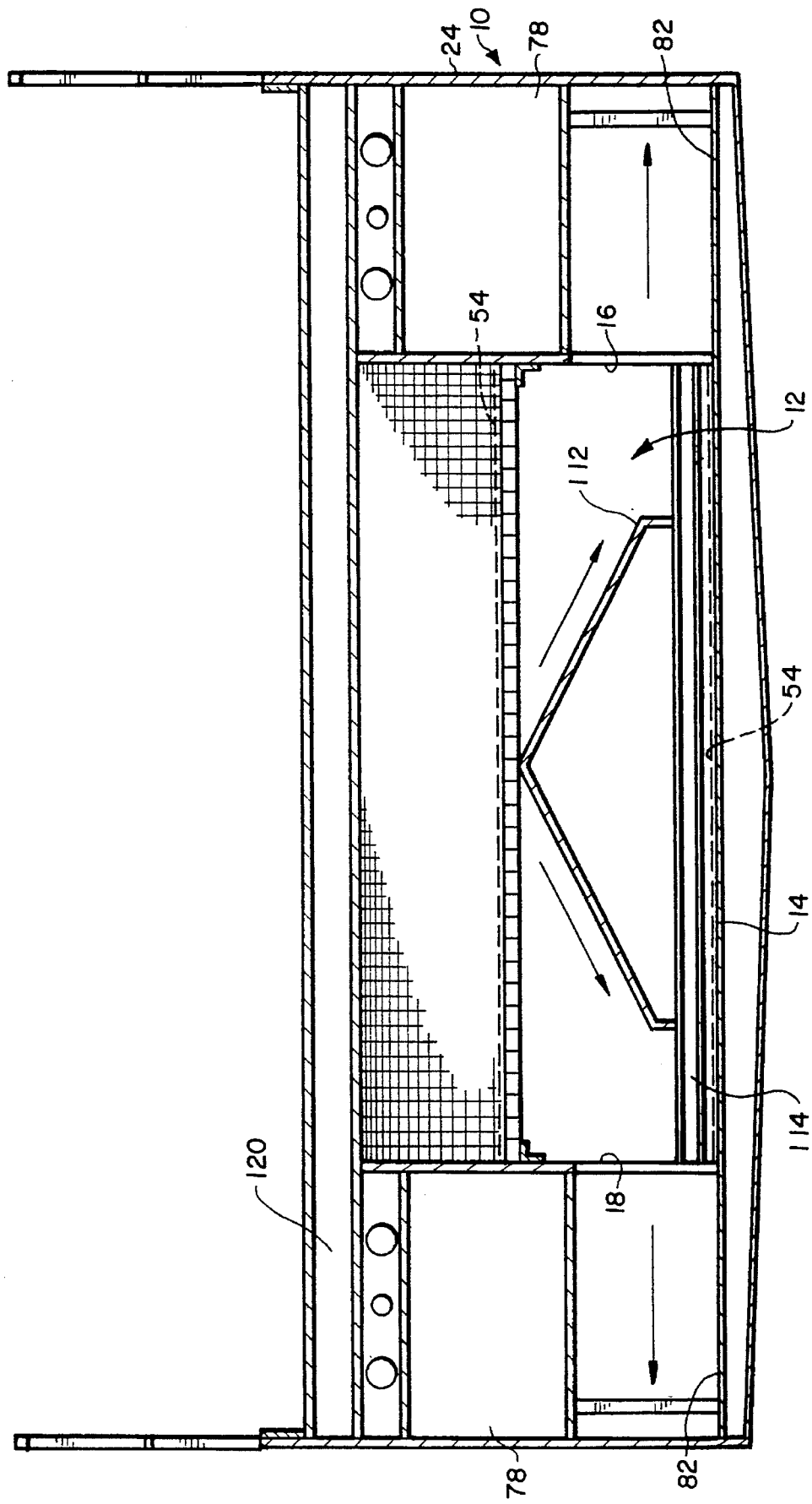
FIG. 4 is a cross sectional view along a section transverse to the longitudinal axis of the vessel of the filter system of the present invention.

The present invention is a filter system for removing a material from a body of water at or near the surface of the body of water. As was noted in the discussion of the prior art, filtration efficiency of prior art filter systems is compromised when a wake is formed ahead of the vessel propelling the filter system through the water. The present invention is designed to avoid the geometric limitations of the prior art designs, thus allowing the area available for the discharge of water to be substantially the same or greater than the area available for the intake of water into the filter system.

In its broadest aspect the present invention is a container having an open end. The container is propelled through the water by any suitable means. The container may be made integral with a surface vessel, the container may be pushed by a tug or other surface vessel, the container may be attached to the side of a surface vessel, or the container may be attached between two surface vessels or pontoon type structures. Further multiple containers may be propelled through the water by the same propelling means.

Regardless of the propelling means, the container is propelled through the water such that its open end faces the direction of motion. Further the container is propelled while being partially submerged such that water is scooped into the container as it is propelled through the water. An endless conveyer type filter screen is arranged within the filter system of the present invention such that substantially all the water entering the open end must pass through the filter screen.

The filter screen forms a continuous loop. The shape of the perimeter of this loop is determined by the positioning of support rollers. These support rollers must be positioned in such a way that the area enclosed by the perimeter of the loop is substantially as large or larger than the projected area of the submerged portion of the open end of the container. Discharge ducts passing through at least one side of the container communicate with the inside of the loop formed by the filter screen. Because the area enclosed by the perimeter of the loop is substantially as large or larger than the projected area of the submerged portion of the open end of the container, the flow area of the discharge ducts can be made substantially as large or larger than the flow area of the water entering the container. It should be noted that if discharge ducts are provided on both sides of the container, then the area enclosed by the loop formed by the filter screen can have a minimum area of about half the flow area of the water entering the container.

This arrangement minimizes the resistance to the flow of water through the container, thus minimizing any harmful wake formation, while allowing for the passage of the incoming water through the filter screen. Resistance to water flow is further reduced because, by using the arrangement of the present invention, water passes through the filter screen only once before being discharged. A flow diverter can be positioned within the container to smooth the flow of water through the change of direction from intake to discharge.

The amount of water passing through the container can be controlled by the speed at which it is propelled and by the depth to which the container is submerged. The depth to which the container is submerged can be varied in a variety of ways. For example, the propelling vessel may have ballast tanks which can be flooded or blown to vary its draft, or the container can be attached to the propelling vessel by hydraulic or screw jacks which can raise or lower the container relative to the propelling vessel.

The filter system of the present invention can have many uses such as skimming spilled oil near the water surface, harvesting algae, or harvesting aquatic plants such as kelp. Referring to the drawings, the present invention is illustrated as being integral with a propelling vessel 10. To aid in the description, the vessel 10 will be discussed in the context of harvesting algae. However, it should be readily apparent that the illustrated embodiments can also be used for skimming oil or harvesting aquatic plants.

The vessel 10 has an intake area 12 which is effectively the container discussed above. The intake area has a bottom 14, a left side 16, a right side 18, a closed rear 20, and an open front 22. The bow of vessel 10 resembles an amphibious landing ship with large hollow spaces on either side of the intake area 12, between the intake area 12 and the hull 24.

At the open front 22 a pivoting gate 26 is provided. The gate 26 is pivotably supported by a pivot shaft 28. A pair of arms 30 are fixedly attached to the gate 26. A pair of hydraulic cylinders 32, acting via arms 30 can selectively lower or raise the gate 26 by causing the gate 26 to pivot about shaft 28. The shaft 28 is supported at either side of the bottom of the open front 22 by sliding seals 34. A second pair of hydraulic cylinders 36 can move the shaft 28 horizontally.

Obviously when vessel 10 is in the water, the bottom 14 will be below the water line. Therefore, it should be apparent that with the gate 26 lowered, water will rush into the intake area 12 as the vessel 10 is propelled through the water. Before rushing into intake area 12, the water must first pass through a movable screen 38. The screen 38 is made of a series of parallel bars, and has a first end 40 and a second end 42. The first end 40 is pivotably attached to the swinging end 44 of the gate 26. The second end 42 is slidably supported by rollers 46 in respective tracks 48. As the gate 26 swings down, the screen 38 is lowered and is automatically positioned in the flow path of the incoming water. The screen 38 is positioned in the flow path of the water by pivoting at its end 40 while its end 42 slides along tracks 48. The screen 38 is intended to keep large debris such as floating logs or branches out of the intake area 12.

The angle of inclination of screen 38 relative to the horizontal is a function of the percentage of the surface area of the screen 38 which is unobstructed. For example, if the bars of screen 38 are one quarter inch thick and set three quarters of an inch apart, then seventy five percent of the surface area of screen 38 will be unobstructed. For the unobstructed area of the screen 38 to then equal the intake flow area, the screen 38 must be inclined from the horizontal at an angle equal to $\sin^{-1} 0.75$ when the gate 26 is lowered.

After passing through screen 38 the water must pass through a fixed screen 50. As in the case of screen 38, the angle of inclination of screen 50 must be chosen such that the unobstructed area of screen 50 which is below water level, equals the intake flow area. The screen 50 further removes still relatively large debris which may have passed through screen 38.

When gate 26 is fully lowered, the hydraulic cylinders 36 will move the shaft 28 forward in the direction of the bow of the vessel 10. This forward movement of shaft 28 creates a gap between the end 52 of the gate 26 and screen 50 allowing debris trapped by screen 50 to pass under the vessel 10. This practice of supporting screens 38 and 50 at an angle increases the unobstructed area available for water flow, thus further aiding in keeping the resistance to water flow, through the filter system, to a minimum. Minimizing the resistance to water flow in turn reduces the harmful wake discussed previously.

The bow structure described above is optimized for harvesting algae in lakes, although it can also be used for skimming oil. For use in harvesting kelp or other aquatic plants, screens 38 and 50 would have to be removed and a cutting apparatus (not shown) fitted to the swinging end 44 of the gate 26. Suitable cutting apparatuses are well known in the art and for example include the type having a series of fixed triangular guides interdigitated by a series of moving triangular blades.

Once the in-rushing water passes screen 50 it encounters the endless conveyer type filter screen 54. The filter screen 54 is supported by rollers 56, 58, and 60. The roller 56 is positioned as close to the bottom of the open front 22 as possible. Roller 58 is positioned near the rear bulkhead 20 of the intake area 12 at a predetermined height from the bottom 14. Roller 60 is positioned near the rear bulkhead 20 of the intake area 12 as close as possible to the bottom 14.

Filter screen 54 is looped around rollers 56, 58, and 60. A tension roller 62 keeps the filter screen 54 tight around rollers 56, 58, and 60. Roller 62 is supported by a pair of pivoting arms 64 which are biased toward the bow of the boat. Arms 64 can be biased by any suitable means such as springs of various types, or hydraulic cylinders controlled by pressure sensors. The action of roller 62 creates some room under the roller 58. This room under the roller 58 allows the positioning of a hopper 66 at that location. The hopper 66 collects the material, such as algae or globs of oil filtered from the incoming water, falling off of filter screen 54 as it goes around roller 58.

Viewed in cross section, the loop of the filter screen 54 roughly forms the perimeter of a triangle. The filter screen 54 extends in a straight line between the roller 56 and the roller 58. Again as with screens 38 and 50, this straight line should make an angle with the horizontal such that the unobstructed area, as dictated by mesh size or pore size, of the portion of the filter screen 54 extending between rollers 56 and 58 equals the vertical projection of the total area of the portion of the filter screen 54 extending between rollers 56 and 58.

The construction of the filter screen 54 is dependent upon the particular application for which the filter system is intended for. For skimming oil, the filter screen 54 would be made of an oleophilic mesh material well known in the art. For harvesting algae or kelp, the filter screen 54 can be made of any fine mesh material.

Rollers 60 and 56 are positioned as close to the bottom 14 as possible so that filter screen 54 will pass as close to the bottom 14 as possible. The roller 58 is powered by motor 68 which keeps the filter screen 54 moving around rollers 56, 58, and 60. As the incoming water passes through the filter screen 54 algae or globs of oil carried in the water are trapped by the filter screen 54 and carried toward roller 58. As the filter screen 54 goes around roller 58 the material it carries falls into hopper 66. An air knife 70 blows compressed air at the inside of the filter screen 54 so that all adhered material is removed from the returning filter screen 54. Alternatively, scrapers or blades which scrape the outside of the filter screen 54 may be used, in addition to or in place of the air knife 70, to remove adhered material from the filter screen 54 after or as the filter screen passes around the roller 58.

The material collected in hopper 66 is conveyed by a screw conveyer 72, provided at the bottom of hopper 66, to another conveyer (not shown) of any suitable type for transportation to processing and storage equipment 74 and 76. U.S. Pat. No. 3,951,805, issued to Dodd and incorporated herein by reference, shows suitable processing equipment for the processing of algae. In an algae harvester made in accordance with the present invention, the processing and storage equipment 74 and 76 would be generally of the same nature as those disclosed in U.S. Pat. No. 3,951,805. U.S. Pat. No. 4,105,554, issued to Janson and incorporated herein by reference, shows suitable processing equipment for the processing of oil recovered from an oil spill. In an oil skimmer made in accordance with the present invention, the processing and storage equipment 74 and 76 would be generally of the same nature as those disclosed in U.S. Pat. No. 4,105,554. In an embodiment as a kelp harvester, a simple storage tank would suffice. It should be noted that the processing and storage equipment, shown in the previously cited patents, are intended only as examples of the types of equipment that can be used with the filter system of the present invention, and that these examples are not intended to limit the scope of the present invention in any way.

The rate at which water, carrying the material to be separated, enters the intake area 12 is dictated by the forward speed of vessel 10 and the depth of the swinging end 44 of the gate 26 below the water line. The depth of the gate 26 can be adjusted by adjusting the draft of the vessel 10. Systems for adjusting the draft of a surface vessel are well known in the art, an example being shown in U.S. Pat. No. 5,043,065, incorporated herein by reference. Most Preferably ballast tanks 78 are flooded or blown with the aid of the air pump 80 to lower or raise, respectively, the vessel 10 in the water. The speed of the filter screen 54 is preferably such that clean, fresh filter screen material is presented to the incoming water on a continuous basis.

The embodiment illustrated in FIGS. 1A through 4, has two sets of discharge ducts, one set being provided on each side of the intake area 12. Each set of ducts includes three different types of ducts 82, 84, and 86. All these ducts communicate with the space enclosed by the loop of the filter screen 54 at one end thereof. Ducts 82 and 84 lead to the body of water on the outside of the vessel 10. Flow through the ducts 86 is controlled by the gates 88.

Gates 88 are hinged to pivot between a first position and a second position under the control of hydraulic cylinders 90. In the first position gates 88 shut off flow through the ducts 86 and allow water from outside the vessel 10 to flow to the jet drive intakes 92. In the second position gates 88 allow water from the intake area 12 to flow, through the ducts 86, to the jet drive intakes 92 while shutting off flow from outside the vessel 10 to the jet drive intakes. Hydraulic cylinders 90 can control the positions of the gates 88 such that the gates 88 can assume any position intermediate the first and second positions. The reason for the provision of gates 88 is to allow the propulsion system of the vessel 10 to assist in moving water out of the intake area 12. Bearing in mind that water must be moved out of the intake area as fast as it enters the intake area 12 to reduce wake formation, it becomes apparent that at times it may be advantageous to allow the propulsion system of the vessel 10 to assist in moving water out of the intake area 12. The degree to which the propulsion system of the vessel 10 assists in moving water out of the intake area 12 can be adjusted as necessary by the position of gates 88.

Ducts 82 are simple rectangular cross section ducts that allow for the passive flow of water out of the intake area 12. Ducts 84 have powered propellers 94 provided in them to actively enhance the rate of water flow out of the intake area when necessary. Ducts 82 and 84 are provided with hydraulically controlled shutoff valves 96 and 98, respectively, whose function will be explained below. All the ducts 82, 84, and 86 are angled rearward toward the stern of the vessel 10 to smooth the flow out of the intake area 12.

The discharge ducts 82, 84, and 86 are located as low in the hull as possible. Because there are two sets of ducts, the area of the loop of the filter screen 54, as viewed in cross section, should at least be half the area of the water intake flow path. However since ducts 82, 84, and 86 are rectangular in cross section, and since they must fit within the area circumscribed by the filter screen 54, the area of the loop of the filter screen 54 should preferably be far larger than half the area of the water intake flow path. This arrangement allows the available discharge duct cross sectional area to be larger than the area of the water intake flow path. Note that the area of the water intake flow path is the vertical projection of an area circumscribed by the bottom 14, the water surface at the open front 22, and the left and right sides of the intake area 12. Most preferably, the total cross sectional area of the ducts 82 and 84 should be greater than the highest anticipated area of the water intake flow path. Therefore, the total cross sectional area of the ducts 82 and 84 should be at least as large as about one half the area obtained by multiplying the width of the intake area 12 by the depth of the intake area 12. More preferably, the total cross sectional area of the ducts 82 and 84 should be at least as large as about seventy five percent of the area obtained by multiplying the width of the intake area 12 by the depth of the intake area 12.

After the water passes to the interior of the loop of the filter screen 54, it flows out through the discharge ducts 82, 84, and 86. With the geometry of the filter system determined according to the principles discussed above, water will flow out of the discharge ducts as fast as it enters the open front 22 without the formation of a wake that would be unacceptably detrimental to the filtration efficiency.

Referring to FIG. 2, the discharge end of the ducts 82 and 84 are in a depression 100 in the side of the hull below the water line. The depression 100 creates a low pressure area at the discharge end of ducts 82 and 84, thus further facilitating movement of water out of the intake area 12. The inlet to the depression 100 may be provided with a screen (not shown), for example a series of parallel vertical bars or a mesh, lying flush with the hull 24 to keep out debris.

The vessel 10 is propelled in the water by a jet drive unit 102. Jet drive unit 102 is powered by two diesel engines 104 of, for example, about five hundred horsepower each. As was stated previously, two intakes 92 are provided on either side of the vessel 10 for the jet drive unit 102. Water entering intakes 92 is conducted to the stern of the vessel 10 by pipes 106 running along either side of the vessel 10. The flows from the two pipes 106 are combined in the jet drive intake manifold 108 before being fed to the jet drive unit 102. The water is then discharged at high speed through the jet nozzle 110 to propel the vessel 10.

A flow diverter 112 is located within the space circumscribed by the filter screen 54. The flow diverter 112 is supported above the bottom 14 by beams 114. Removable grates 116 cover the exposed portions of beams 114 and allow for access by service personnel to the space under the diverter 112. The flow diverter 112 functions to smoothly split the flow passing through filter screen 54 and smoothly direct each portion of that flow toward the discharge ducts 82, 84, and 86. The diverter 112 as illustrated is in the form of a triangular ridge which increases in height along its length, being lower in the front and higher in the back. The specific shape of the diverter 112 shown in the drawings, is for illustration purposes only. The optimum shape for the diverter 112 can be determined based on the principles of fluid dynamics. The diverter 112 helps to reduce the resistance to flow through the intake area 12, thus again aiding in wake reduction.

A grate system 118 gives backing support to the filter screen 54 between rollers 56 and 58. The grate system 118 also has removable panels for service access. The deck beams 120 are also covered with removable grates 122 for added safety while allowing for service access to the intake area 12.

When travelling to or from the site of the filtering or harvesting operation the drag on vessel 10 should be minimized. For travelling the ballast tanks are blown to raise the vessel 10. The gate 26 is raised and closed. Rubber sealing strips 124 provided around the open front 22 prevent water leakage around the gate 26. Gates 88 are returned to the first position to shut off flow through the ducts 86 and to allow water from outside the vessel 10 to flow to the jet drive intakes 92. Hydraulically controlled shutoff valves 96 and 98 are closed to prevent flow through ducts 82 and 84. The Pumps 126 are then turned on to discharge all the water remaining in the intake area 12. These measures further elevate the vessel 10 in the water, thus allowing the vessel 10 to travel at high speed efficiently. Note that as in flow rate through ducts 82 and 84 in addition to turning the flow through those ducts completely on or off.

In the present invention the incoming water passes through the filter screen 54 only which also aids in reducing resistance to flow and thus in reducing the harmful wake. Most prior art endless conveyer type filters are routed around the rollers such that the water has to pass through the filter screen twice resulting in greater resistance to flow and in consequent wake generation.

The location of the jet drive intakes on the sides of the vessel 10 also has the added advantage that, unlike intakes that draw water through the bottom of the vessel, in shallow water the silt at the bottom of the body of water is not as violently disrupted. This feature reduces contamination of the material being separated from the water because the water is not muddied as much as would be the case with a bottom intake. Further because the silt at the bottom of the body of water is not as violently disturbed, the present invention has less of a harmful effect on bottom dwelling aquatic life including various species of fish, crustaceans, insect larvae, and fish eggs.

Figure 5:
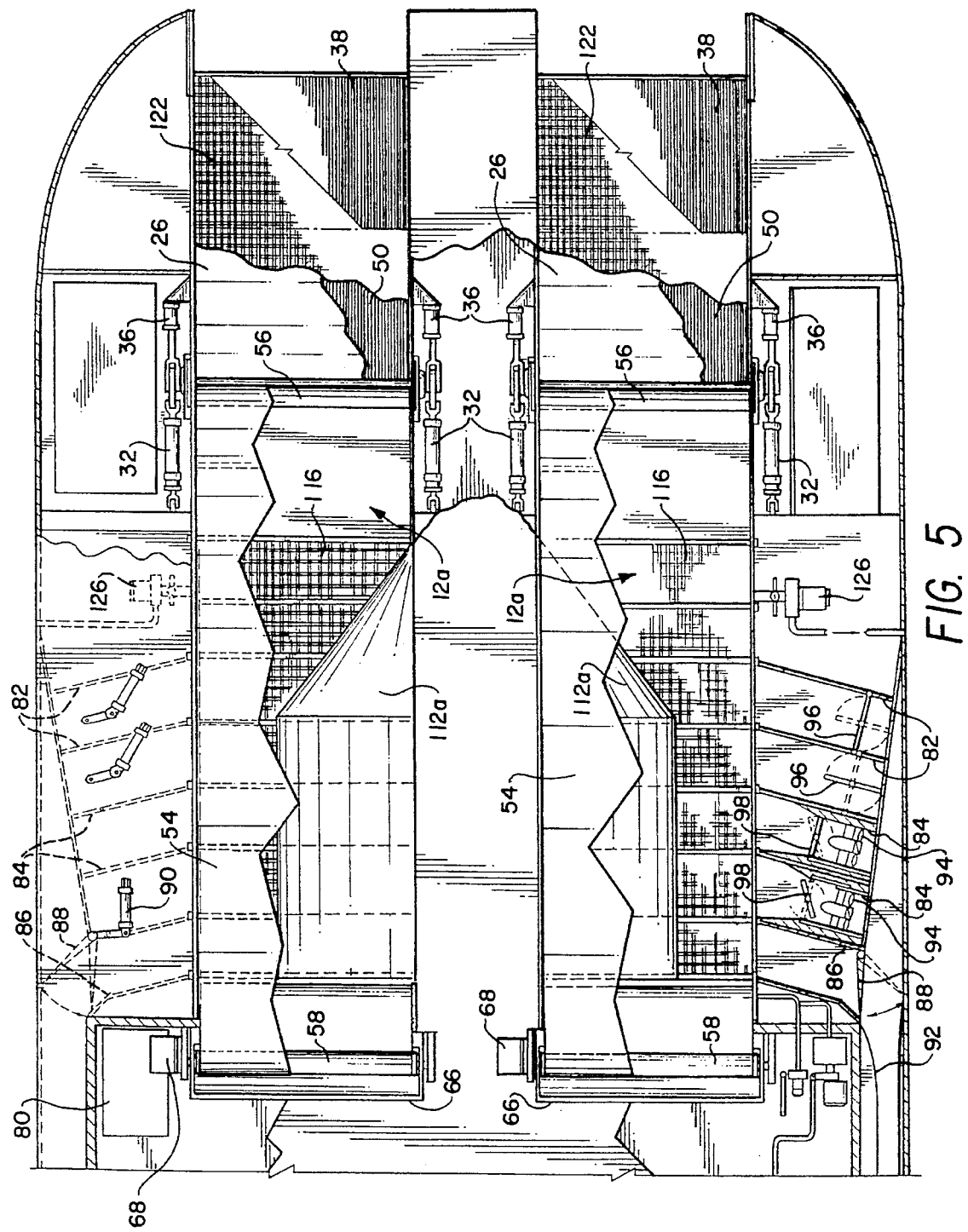
FIG. 5 is a top plan view of the bow portion of an alternative embodiment of the filter system of the present invention having dual intake areas, partially broken away to reveal internal detail.

Referring to FIG. 5, an alternative embodiment of the present invention is seen. This embodiment differs from that of FIGS. 1A through 4 in that it has twin intake areas 12a at its bow. The intake areas 12a discharge to one side only. The shape of the diverters 112a has been modified accordingly since the diverter no longer has to split the incoming flow, but only to divert the flow to one side. It should also be noted that any number of idler or powered rollers may be added to the illustrated example, to route the filter screen 54 along any desired path, without departing from the scope and spirit of the present invention.

It is to be understood that the present invention is not limited to the embodiments described above, but encompasses any and all embodiments within the scope of the following claims.

I claim:

1. A filter system for removing a material from a body of water, said filter system comprising:

a container having a closed rear, a bottom, a left side, a right side, and an open front;

means for supporting support rollers relative to said container;

means for propelling said container through a body of water having a surface with a portion of said container including at least said bottom of said container being submerged below the surface of the body of water to a predetermined depth, whereby t water rushes into said open front of said container as said container is propelled through the body of water;

an endless filter screen supported by said support rollers such that the water rushing into said open front passes through said filter screen, said filter screen being in continuous motion about said support rollers, said filter screen circumscribing a space, whereby material to be separated from the water is trapped by said filter screen and moved out of the water; and discharge means communicating with said space circumscribed by said filter screen, said discharge means passing through at least one of said left side and said right side of said container, said discharge means allowing for filtered water in said container to be discharged to the body of water, said discharge means having a flow area at least as large as the flow area of the water rushing into said container.

2. The filter system according to claim 1, further including:

a diverter positioned within said space circumscribed by said filter screen, said diverter smoothing the flow of water toward said discharge means.

3. The filter system according to claim 2, wherein said discharge means includes:

a first set of ducts passing through said right side of said container; and a second set of ducts passing through said left side of said container.

4. The filter system according to claim 3, wherein said first set of ducts includes a first hollow duct which acts as a passive fluid conduit and a first duct having a powered propeller provided therein; and said second set of ducts includes a second hollow duct which acts as a passive fluid conduit and a second duct having a powered propeller provided therein.

5. The filter system according to claim 1, further including:

a gate hingedly supported at said open front of said container proximate to said bottom of said container, said gate acting as a closure for said container when raised and allowing water to rush into said container when lowered.

6. The filter system according to claim 5, further including:

movable screen having first and second ends, said movable screen being hingedly attached to said gate at said first end thereof, said second end of said movable screen being slidably supported in a pair of tracks proximate said open front of said container.

7. The filter system according to claim 1, further including:

means for varying said predetermined depth to which said portion of said container is submerged.

8. The filter system according to claim 1, wherein said means for propelling is a surface vessel having a stern and a bow, said surface vessel having said container integrally incorporated into said bow thereof, said surface vessel being powered by a jet drive having intakes located on either side of said surface vessel.

9. The filter system according to claim 8, further including:

a diverter positioned within said space circumscribed by said filter screen, said diverter smoothing the flow of water toward said discharge means.

10. The filter system according to claim 9, wherein said discharge means includes:

a first set of ducts passing through said right side of said container; and a second set of ducts passing through said left side of said container.

11. The filter system according to claim 10, wherein said first set of ducts includes a first hollow duct which acts as a passive fluid conduit and a first duct having a powered propeller provided therein; and said second set of ducts includes a second hollow duct which acts as a passive fluid conduit and a second duct having a powered propeller provided therein.

12. The filter system according to claim 8, further including:

a gate hingedly supported at said open front of said container proximate to said bottom of said container, said gate acting as a closure for said container when raised and allowing water to rush into said container when lowered.

13. The filter system according to claim 12, further including:

movable screen having first and second ends, said movable screen being hingedly attached to said gate at said first end thereof, said second end of said movable screen being slidably supported in a pair of tracks proximate said open front of said container.

14. The filter system according to claim 8, further including:

means for varying said predetermined depth to which said portion of said container is submerged.

15. The filter system according to claim 1, wherein said means for propelling is a surface vessel having a stern and a bow, said surface vessel having a first said container integrally incorporated into said bow thereof, said surface vessel having a second said container integrally incorporated into said bow thereof along side said first said container, said surface vessel being powered by a jet drive having intakes located on either side of said surface vessel.

16. The filter system according to claim 15, wherein each of said first said container and said second said container further includes:

a diverter positioned within said space circumscribed by said filter screen, said diverter smoothing the flow of water toward said discharge means.

17. The filter system according to claim 16, wherein said discharge means includes:

a first set of ducts passing through said right side of said container and communicating with said first said container; and a second set of ducts passing through said left side of said container and communicating with said second said container.

18. The filter system according to claim 17, wherein said first set of ducts includes a first hollow duct which acts as a passive fluid conduit and a first duct having a powered propeller provided therein; and said second set of ducts includes a second hollow duct which acts as a passive fluid conduit and a second duct having a powered propeller provided therein.

19. The filter system according to claim 15, further including:

a first gate hingedly supported at said open front of said first said container proximate to said bottom of said first said container, said first gate acting as a closure for said first said container when raised and allowing water to rush into said first said container when lowered; and a second gate hingedly supported at said open front of said second said container proximate to said bottom of said second said container, said second gate acting as a closure for said second said container when raised and allowing water to rush into said second said container when lowered.

20. A filter system for removing a material from a body of water, said filter system comprising:

a container having a closed rear, a bottom, a left side, a right side, and an open front;

means for supporting support rollers relative to said container;

means for propelling said container through a body of water having a surface with a portion of said container including at least said bottom of said container being submerged below the surface of the body of water to a predetermined depth, whereby water rushes into said open front of said container as said container is propelled through the body of water;

an endless filter screen supported by said support rollers such that the water rushing into said open front passes through said filter screen, said filter screen being in continuous motion about said support rollers, said filter screen circumscribing a space, whereby material to be separated from the water is trapped by said filter screen and moved out of the water, said filter screen having an unobstructed area, said filter screen being inclined at an angle as the water rushing into said container passes therethrough such that an area of a vertical projection of said filter screen is substantially equal to said unobstructed area of said filter screen; and discharge means communicating with said space circumscribed by said filter screen, said discharge means passing through at least one of said left side and said right side of said container, said discharge means allowing for filtered water in said container to be discharged to the body of water.

* * * * *